(12) United States Patent
Soji et al.

(10) Patent No.: US 6,374,206 B1
(45) Date of Patent: Apr. 16, 2002

(54) RECORDING AND REPRODUCING DEVICE

(75) Inventors: Kenji Soji; Tadami Sugawara, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/207,570

(22) Filed: Dec. 8, 1998

(30) Foreign Application Priority Data

Dec. 17, 1997 (JP) .............................................. 9-347640

(51) Int. Cl.[7] .............................................. G06F 13/14
(52) U.S. Cl. .......................... 703/25; 703/21; 324/754; 324/755; 710/38
(58) Field of Search ..................... 703/21, 25; 324/754, 324/755; 710/38

(56) References Cited

U.S. PATENT DOCUMENTS

| | | | | |
|---|---|---|---|---|
| 4,568,161 A | * | 2/1986 | DiGianfilippo et al. | 353/25 |
| 4,620,282 A | * | 10/1986 | Shelley | 364/489 |
| 5,170,113 A | * | 12/1992 | Albonesi | 324/66 |
| 5,250,908 A | * | 10/1993 | Liu et al. | 324/542 |
| 5,280,251 A | * | 1/1994 | Strangio | 324/539 |
| 5,557,669 A | * | 9/1996 | Perry et al. | 379/339 |
| 5,778,254 A | * | 7/1998 | Ohtsuka et al. | 395/858 |
| 6,002,264 A | * | 12/1999 | Gilbert et al. | 324/755 |

FOREIGN PATENT DOCUMENTS

JP          6-43900        6/1994

* cited by examiner

*Primary Examiner*—Kevin J. Teska
*Assistant Examiner*—Thai Phan
(74) *Attorney, Agent, or Firm*—Brinks Hofer Gilson & Lione

(57) ABSTRACT

A recording and reproducing device of the invention comprises a first connector having a plurality of contacts and gate circuits for receiving signals from a computer body. The first connector is connected to the computer body and also to a second connector having a plurality of contacts. The second connector has first contacts grounded on the computer body side and a second contact to which a signal from the computer body is not supplied. The first connector has third contacts connected to the gate circuits and a fourth contact which is connected to the second contact in a first connecting state and is connected to the first contact in a second connecting state. The fourth contact is connected to the control terminals of the gate circuits.

2 Claims, 3 Drawing Sheets

RECORDING AND REPRODUCING DEVICE

BACKGROUND OF THE INVENTION

1. Field of the Invention

The present invention relates to a recording and reproducing device mounted in a so-called personal computer. More particularly, the invention relates to a recording and reproducing device in which erroneous recording to a medium caused by erroneous connection of connectors for connecting the body of a personal computer and the recording and reproducing device is prevented.

2. Description of Related Art

A conventional recording and reproducing device will be described with reference to FIGS. 4 and 5. FIG. 4 is a perspective view showing a method for connecting the recording and reproducing device and the body of a personal computer (hereinbelow, simply called a computer). On a side face of a recording and reproducing device 41, a male connector 42 through which a signal is transmitted and received to/from the body of a computer (not shown) is attached. The male connector 42 is constructed in such a manner that a plurality of pin-shaped contacts 42b (hereinbelow, when all of the contacts are referred to, they are shown as contacts 42b, and when each of the contacts is specified, a suffix is added like "contact 42b1") are vertically inserted in two rows into a rectangular-parallelepiped insulating stand 42a which is made of a resin material.

On the other hand, a flat cable 43 is led from the body of the computer and a female connector 44 is attached to the tip of the flat cable 43. The female connector 44 is similarly constructed in such a manner that female contacts 44b (refer to FIG. 5, hereinbelow, the whole contacts are indicated as contacts 44b and each of the contacts is specified by adding a suffix like "contact 44b1") are inserted in two rows into a rectangular-parallelepiped insulating stand 44a which is made of a resin material.

In a state where the recording and reproducing device 41 is mounted in the computer body, the male connector 42 and the female connector 44 are fitted together, the contacts of the connectors are connected to each other, and signals are transmitted and received between the recording and reproducing device 41 and the computer body.

A recording head, a spindle motor, and the like (not shown) are assembled in the recording and reproducing device 41. Data is recorded and reproduced to/from a medium such as a floppy disk (not shown) inserted into the recording and reproducing device 41 in response to signals from the computer body.

FIG. 5 shows the arrangement of the contacts 42b in the male connector 42, the arrangement of the contacts 44b in the female connector 44, and a gate circuit in the recording and reproducing device 41 which is connected to the contacts 42b.

The contacts 42b are arranged in two rows each consisting of 17 contacts in the male connector 42 and the contacts 44b are arranged in two rows each consisting of 17 contacts in the female connector 44. In the male connector 42, odd-number contacts 42b1, 42b3, . . . 42b33 are disposed in one of the rows and even-number contacts 42b2, 42b4, . . . 42b34 are disposed in the other row. Similarly, in the female connector 44, odd-number contacts 44b1, 44b3, . . . 44b33 are disposed in one of the rows and even-number contacts 44b2, 44b4, . . . 44b34 are disposed in the other row. In a state where the male connector 42 and the female connector 44 are fitted together, the odd-number contacts 42b1, 42b3, . . . 42b33 of the male connector 42 are correspondingly connected to the odd-number contacts 44b1, 44b3, . . . 44b33 of the female connector 44, respectively and the even-number contacts 42b2, 42b4, . . . 42b34 of the male connector 42 are correspondingly connected to the even-number contacts 44b2, 44b4, . . . 44b34 of the female connector 44, respectively.

The recording and reproducing apparatus 41 has therein a gate array 45 for receiving signals from the computer body. The contacts 42b of the male connector 42 and gate circuits 45g (hereinbelow, the whole gate circuits are indicated as the gate circuits 45g and each of the gate circuits is specified by adding a suffix like "gate circuit 45g2") in the gate array 45 are connected to each other. The gate circuits 45g are constructed by a plurality of logic circuits. The gate circuits 45g are connected to a circuit part (not shown) for controlling a recording operation provided in the recording and reproducing device 41.

When signals are transmitted and received between the computer body and the recording and reproducing device 41 via the male connector 42 and the female connector 44, signals allocated to the contacts 42b of the male connector 42 (similarly, signals allocated to the contacts 44b of the female connector 44) are determined by the numbers of the contacts. In this case, all of the contacts 42b1, 42b3, . . . 42b33 (the contacts 44b1, 44b3, . . . 44b33 in the female connector 44) arranged in odd-number positions are uniformly grounded and signals are allocated to the contacts 42b2, 42b4, . . . 42b34 (the contacts 44b2, 44b4, . . . 44b34 in the female connector 44) which are arranged in even-number positions.

The odd-number contacts 42b1, 42b3 . . . 42b33 of the male connector 42 are grounded in the recording and reproducing device 41 (for instance, in the gate array 45) via an earthing conductor 46. The odd-number contacts 44b1, 44b3, . . . 44b33 of the female connector 44 are grounded via an earthing conductor 47 on the computer body side.

The even-number contacts 42b2, 42b4, 42b8, 42b10, and 42b12 in the male connector 42 are connected to gate circuits 45g2, 45g4, 45g8, 45g10, and 45g12, respectively. Since the contact 42b6 is redundant, it is not connected to the gate circuit and serves as a so-called dead terminal.

As signals transmitted and received between the recording and reproducing device 41 and the computer body, there are a signal such as a reproduction signal from a recording medium, which is transmitted from the recording and reproducing device 41 to the computer body and signals such as a motor-on signal M/O, a motor step signal M/S, a write gate signal W/G, a drive select signal D/S, and a write data signal W/D transmitted from the computer body to the recording and reproducing device 41.

The motor-on signal M/O is a signal for rotating the spindle motor which rotates the recording medium. When the signal is at the low level (Lo), the spindle motor is rotated. When the signal is at the high level (Hi), the rotation is stopped. The motor step signal M/S is a signal for moving the recording head. When the motor step signal M/S changes from the low level (Lo) to the high level (Hi), the recording head is moved. The write gate signal W/G is used for providing a write instruction to write the write data signal W/D to the recording medium. When the write gate signal is at the low level (Lo), the writing instruction is provided. When the signal is at the high level (Hi), the write instruction is cancelled. The drive select signal D/S is a signal for controlling the whole recording operation. When the signal is at the low level (Lo), the whole circuit part (not shown)

for controlling the recording operation in the recording and reproducing device 41 is made operative. When the signal is at the high level (Hi), the whole circuit part is made inoperative. When the drive select signal D/S is at the low level (Lo), therefore, the operation of the circuit part for controlling the recording operation to which the motor-on signal M/O, the motor step signal MIS, and the write gate signal W/G are supplied is controlled.

The write gate signal W/G is allocated to the contact 42$b$2, the write data signal W/D is allocated to the contact 42$b$4, the motor-on signal M/O is allocated to the contact 42$b$8, the drive select signal D/S is allocated to the contact 42$b$10, and the motor step signal M/S is allocated to the contact 42$b$12.

At the time of recording to the recording medium in the recording and reproducing device 41, when the write gate signal W/G, the motor-on signal M/O, and the drive select signal D/S from the computer body become at the low level (Lo), the recording operation is started. When the motor step signal M/S changes from the low level (Lo) to the high level (Hi), the recording head is moved.

In the conventional recording and reproducing device 41, however, since the contacts 42$b$ of the male connector 42 are arranged in two rows each consisting of 17 contacts and the contacts 44$b$ of the female connector 44 are similarly arranged in two rows, when the female connector 44 is inserted into the male connector 42, there is a case of a so-called erroneous reverse insertion. In this case, the odd-number contacts 44$b$1, 44$b$3, . . . 44$b$33 of the female connector 44 are connected to the even-number contacts 42$b$34, . . . 42$b$4, and 42$b$2 in the male connector 42, and the even-number contacts 44$b$2, 44$b$4, . . . 44$b$34 in the female connector 44 are connected to the odd-number contacts 42$b$33, . . . 42$b$3, 42$b$1 in the male connector 42. As a result, all of the even-number contacts 42$b$2, 42$b$4, . . . 42$b$34 in the male connector 42 are grounded via the odd-number contacts 44$b$33, . . . 44$b$3, and 44$b$1 in the female connector 44, respectively. All of input terminals of the gate circuits 45$g$2, 45$g$4, 45$g$8, and 45$g$10, therefore, become at the low level (Lo).

Consequently, when the input terminal of the gate circuit 45$g$10 becomes at the low level (Lo), the same state in which the drive select signal DIS becomes at the low level (Lo) is obtained so that the whole circuit part for controlling the recording operation in the recording and reproducing device 41 is made operative. When the input terminal of the gate circuit 45$g$2 becomes at the low level, the same state in which the write gate signal W/G becomes at the low level (Lo) is obtained so that writing to the recording head is instructed. When the input terminal of the gate circuit 45$g$8 becomes at the low level, the same state in which the motor-on signal M/O becomes at the low level is obtained so that the spindle motor rotates. In such a state, the recording operation is started. Since the input terminal of the gate circuit 45$g$4 is at the low level, as if the record data signal at the low level were inputted to the gate circuit 45$g$2, only a signal at the low level is recorded to a track in the rotating medium over which the recording head is stopped, and the data which has been recorded is erased.

As mentioned above, the conventional recording and reproducing device has a problem such that when the connector on the computer body side and the connector on the recording and reproducing device side are inserted reversely to each other, the data recorded on the recording medium is erased and, instead, erroneous data is recorded.

SUMMARY OF THE INVENTION

It is therefore an object of the invention to provide a recording and reproducing device which does not erase data which has been recorded on a recording medium and does not record erroneous data even when a connector on the computer body side and a connector on the recording and reproducing device side are inserted reversely to each other.

In order to solve the problems, a recording and reproducing device of the invention comprises a first connector having a plurality of contacts and gate circuits each having an input terminal, an output terminal, and a control terminal and receiving a signal from a computer body. The input terminal and the output terminal in the gate circuit are connected or unconnected corresponding to a high-level signal or a low-level signal applied to the control terminal. The first connector is connected to the computer body and a second connector having a plurality of contacts. The first connector and the second connector are connected either in a first connecting state or a second connecting state which is different from the first connecting state. The signal is supplied to the gate circuit via the first and second connectors in the first connecting state. The second connector has first contacts grounded on the computer body side and a second contact to which the signal from the computer body is not supplied, the first connector has third contacts connected to the gate circuits and a fourth contact which is connected to the second contact in the first connecting state and is connected to the first contact in the second connecting state, and the fourth contact is connected to the control terminals of the gate circuits.

In a recording and reproducing device of the invention, plural sets of the third contacts and the gate circuits connected to the third contacts are provided. The signals include at least a drive select signal for making the whole circuit part for controlling a recording operation in the recording and reproducing device operative. The fourth contact is connected to the control terminal of the gate circuit to which at least the drive select signal is supplied.

BRIEF DESCRIPTION OF PREFERRED EMBODIMENTS

Figure 1:
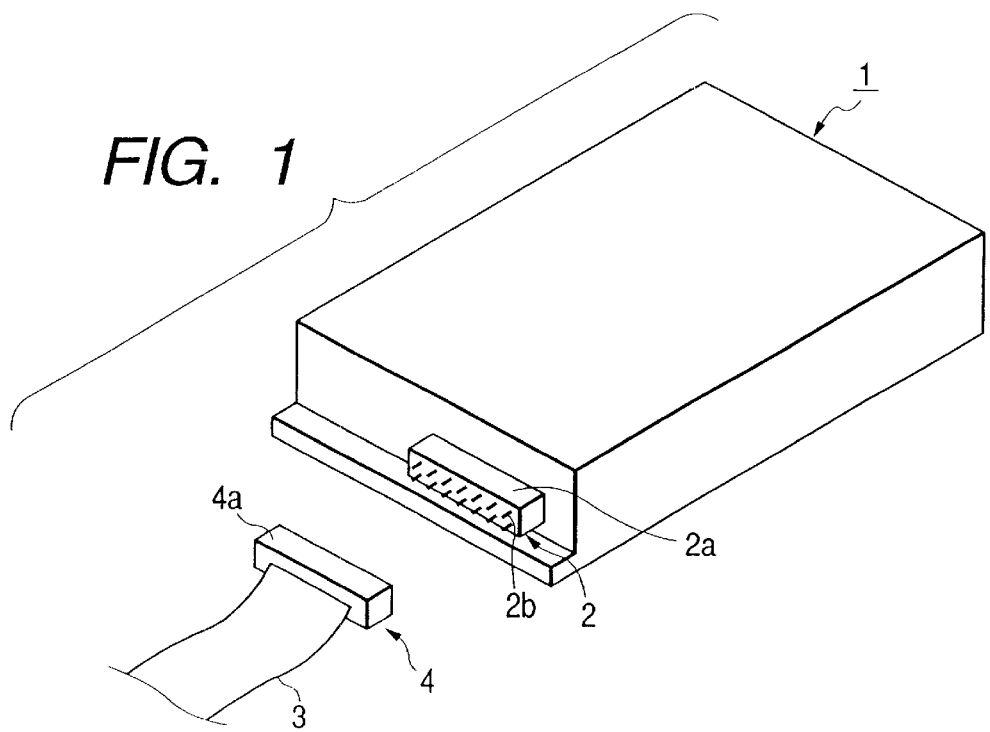
FIG. 1 is a perspective view for explaining the connection between a recording and reproducing device of the invention and a computer body.

An embodiment of a recording and reproducing device of the invention will be described with reference to FIGS. 1 to 3. FIG. 1 is a perspective view showing a method of connecting the recording and reproducing device and the body of a personal computer (hereinbelow, simply called a computer). A first connector 2 through which signals are transmitted and received to/from the computer body (not shown) is attached to a side face of a recording and reproducing device 1. The first connector 2 takes the form of a male connector in which a plurality of pin-shaped male contacts 2b (hereinbelow, the whole contacts are indicated as the contacts 2b and an individual contact is specified by adding a suffix like "contact 2b1") are vertically inserted in two rows into a rectangular-parallelepiped insulating stand 2a which is made of a resin material.

On the other hand, a flat cable 3 is led from the computer body and a second connector 4 is attached to the tip of the flat cable 3. The second connector 4 takes the form of a female connector in which pin-shaped female contacts 4b (refer to FIG. 3, hereinbelow, the whole contacts are indicated as the contacts 4b and an individual contact is specified by adding a suffix like "contact 4b1") are vertically inverted in two rows into a rectangular-parallelepiped insulating stand 2a which is made of a resin material.

In a state where the recording and reproducing device 1 is mounted in the computer body, the first connector 2 and the second connector 4 are fitted together, the contacts of the connectors 2 and 4 are connected to each other, and signals are transmitted and received between the recording and reproducing device 1 and the computer body.

A recording head, a spindle motor, and the like (not shown) are assembled in the recording and reproducing device 1. In response to signals from the computer body, data is recorded and reproduced to/from a recording medium such as a floppy disk (not shown) inserted in the recording and reproducing device 1.

Figure 2:
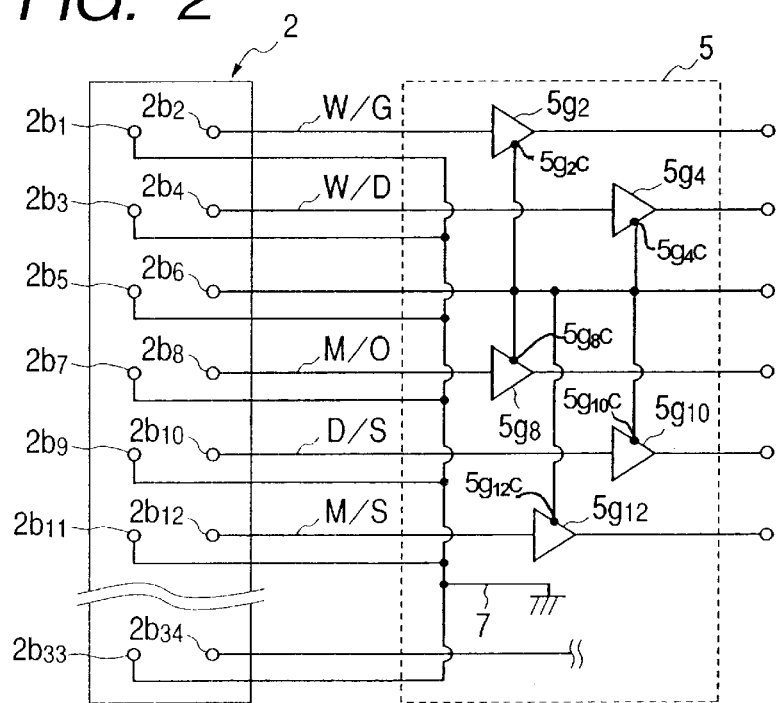
FIG. 2 is a diagram showing the connection between contacts of a connector in the recording and reproducing device of the invention and gate circuits.

FIG. 2 shows arrangement of the contacts 2b in the first connector 2 and gate circuits in the recording and reproducing device 1 which are to be connected to the contacts 2b.

In the first connector 2, the contacts 2b are disposed in two rows each consisting of 17 contacts. In one of the rows, odd-number contacts 2b1, 2b3, . . . 2b33 are arranged. In the other row, even-number contacts 2b2, 2b4, . . . 2b34 are arranged.

Figure 3:
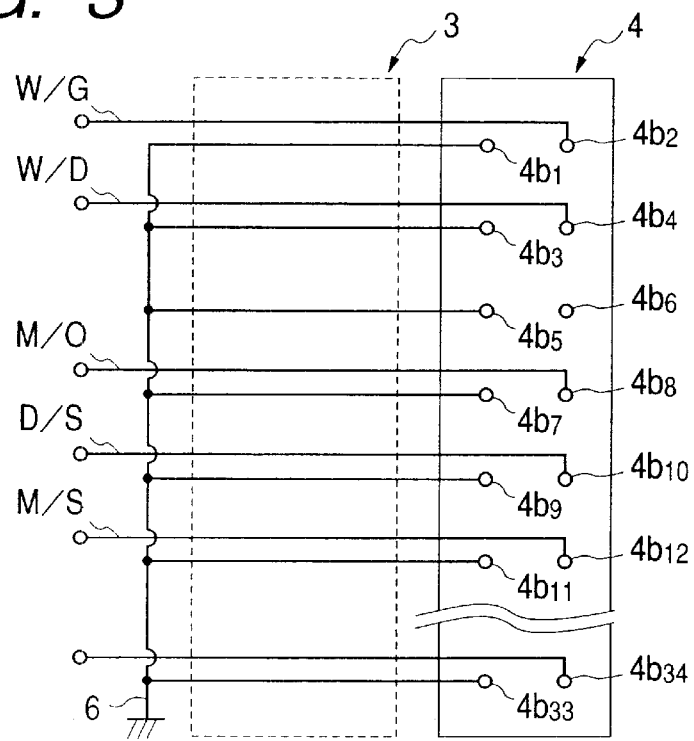
FIG. 3 is a diagram showing arrangement of contacts of a connector on a computer body side to which the recording and reproducing device of the invention is connected.
Figure 4:
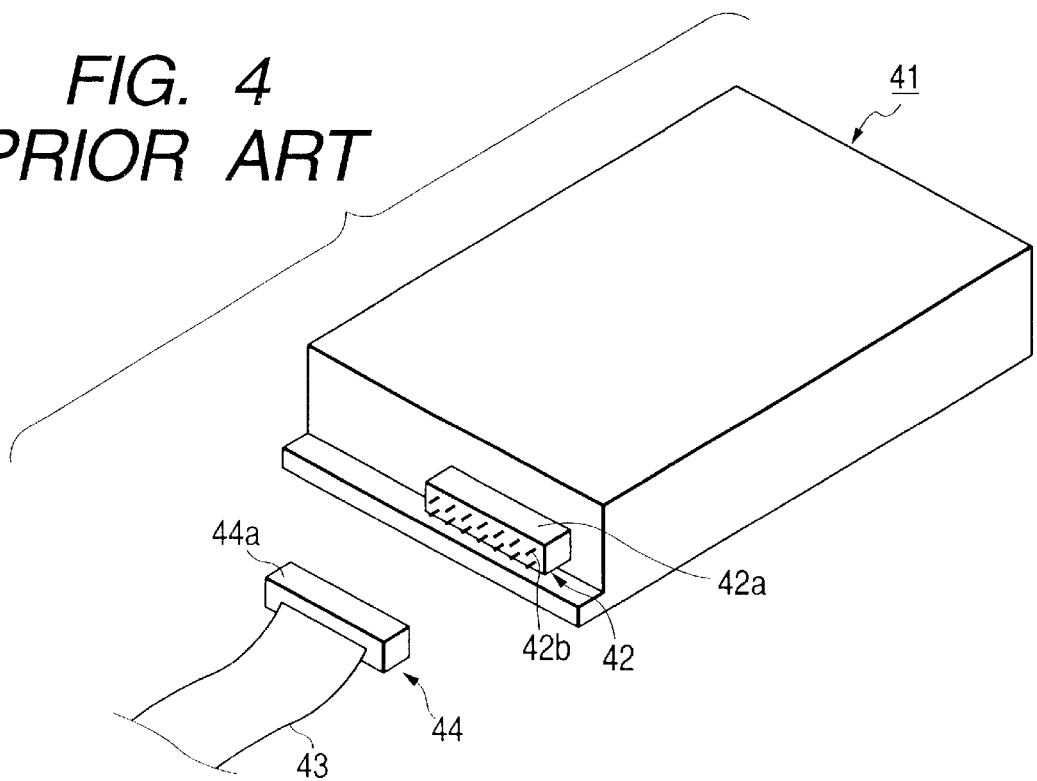
FIG. 4 is a perspective view for explaining the connection between a conventional recording and reproducing device and a computer body.
Figure 5:
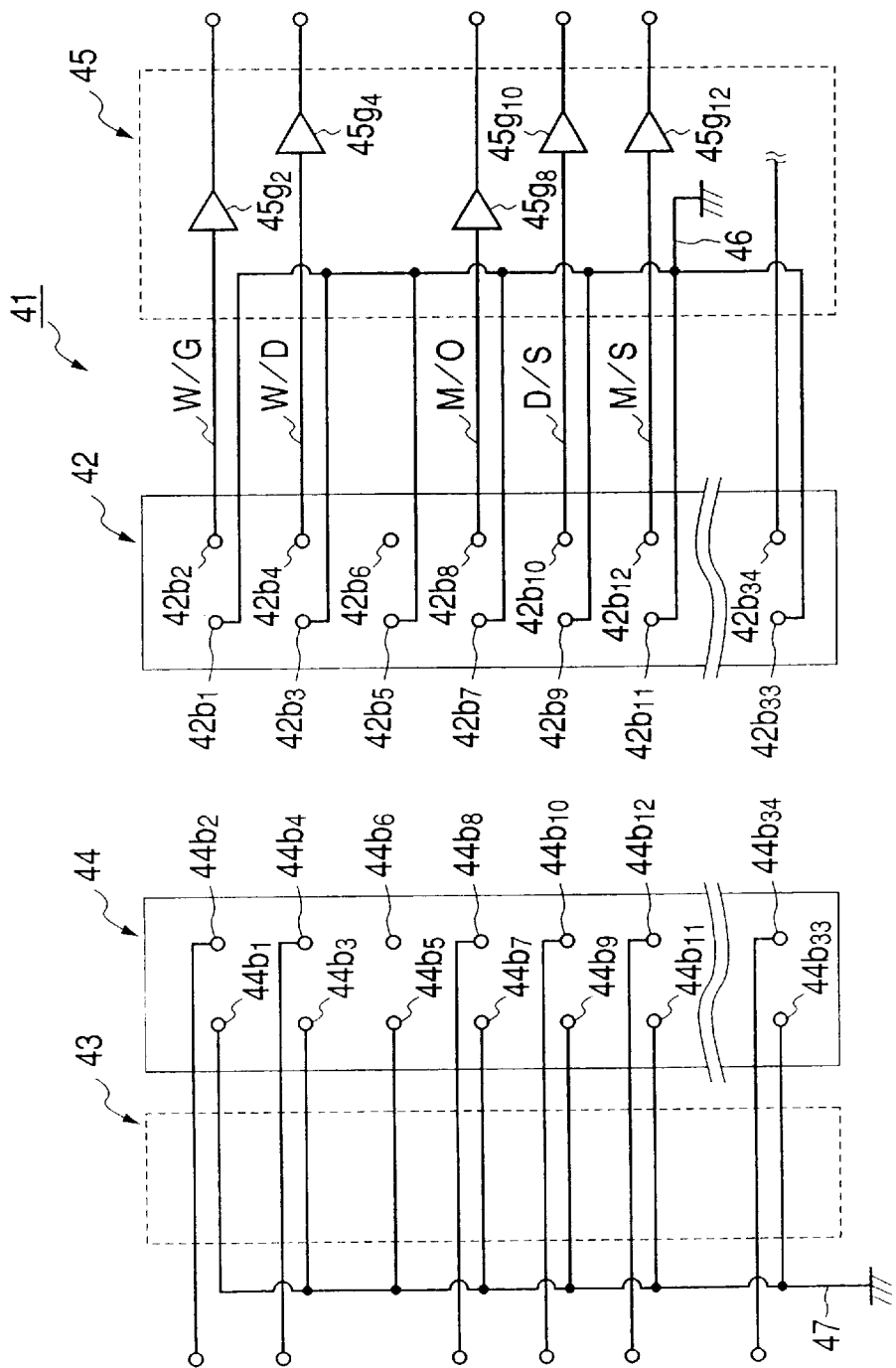
FIG. 5 is a diagram for explaining arrangement of contacts of a connector in the conventional recording and reproducing device, connection between the contacts and gate circuits, and arrangement of contacts of a connector of the computer body.

Similarly, as shown in FIG. 3, in the second connector 4 as well, contacts 4b are arranged in two rows each having 17 contacts. In one of the rows, odd-number contacts 4b1, 4b3, . . . 4b33 are arranged. In the other row, even-number contacts 4b2, 4b4, . . . 4b34 are arranged. Consequently, the first connector 2 and the second connector 4 can be connected in two ways. In the first connecting state, the odd-number contacts 2b1, 2b3, . . . 2b33 in the first connector 2 are correspondingly connected to the odd-number contacts 4b1, 4b3, . . . 4b33 in the second connector 4, respectively. The even-number contacts 2b2, 2b4, . . . 2b34 in the first connector 2 are correspondingly connected to the even-number contacts 4b2, 4b4, . . . 4b34 in the second connector 4, respectively.

The second connecting state is a so-called reverse insertion state. In this case, the odd-number contacts 2b1, 2b3, . . . 2b33 in the first connector 2 are correspondingly connected to the even-number contacts 4b34, . . . 4b4, and 4b2 in the second connector 4, respectively. The even-number contacts 2b2, 2b4, . . . 2b34 in the first connector 2 are correspondingly connected to the odd-number contacts 4b33, . . . 4b3, and 4b1 in the second connector 4, respectively. The first connector 2 and the second connector 4 are used in the first connecting state.

In the recording and reproducing device 1, a gate array 5 for receiving signals from the computer body is provided. The contacts 2b of the first connector 2 and gate circuits 5g (hereinbelow, the whole gate circuits are indicated as the gate circuits 5g and an individual gate circuit is specified by adding a suffix like "gate circuit 5g2" in the gate array 5) are connected to each other. The gate circuits 5g are constructed by a plurality of logic circuits. The gate circuits 5g are connected to a circuit part (not shown) for controlling the recording operation provided in the recording and reproducing device 1.

Each of the gate circuits 5g has an input terminal, an output terminal, and a control terminal. Its output is controlled by the level of a signal applied to the control terminal. When a signal at the high level is applied to the control terminal, the input and output terminals are in a connected state and the inputted signal appears as it is at the output terminal. When a signal at the low level is applied to the control terminal, the input and output terminals are not in a connected state so that the inputted signal does not appear at the output terminal.

When the computer body and the recording and reproducing device 1 transmit and receive signals in the first connecting state of the first connector 2 and the second connector 4, signals allocated to the contacts 2b of the first connector 2 and the contacts 4b of the second connector 4 corresponding to the contacts 2b of the first connector 2 are determined according to the numbers of the contacts. In this instance, contacts 2b1, 2b3, . . . 2b33 and contacts 4b1, 4b3, . . . 4b33 arranged in odd-number positions are uniformly connected to the ground. Signals from the computer body are allocated to the contacts 2b and 4b arranged in even-number positions.

The odd-number contacts 4b1, 4b3, . . . 4b33 as the first contacts in the second connector 4 are grounded on the computer body side by an earthing conductor 6. Signals from the computer body are allocated to be supplied to contacts 4b2, 4b4, 4b8, 4b10, 4b12, and the like among the even-number contacts 4b. A signal from the computer body is not allocated to a second contact 4b6 as a redundant contact among the even-number contacts 4b. The contact 4b6 is a so-called dead terminal.

On the other hand, signals are allocated to contacts 2b in the first connector 2 corresponding to the contacts 4b in the second connector 4. That is, the odd-number contacts 2b1, 2b3, . . . 2b33 are grounded via an earthing conductor 7 in the recording and reproducing device 1 (for example, in the gate array 5). Signals are allocated to third contacts 2b2, 2b4, 2b8, 2b10, and 2b12 among the even-number contacts 2b. Corresponding to the even-number contact 4b6 as the second contact in the second connector 4, a signal is not allocated to the contact 2b6 as a fourth contact among the even-number contacts in the first connector 2.

In the recording and reproducing device 1, gate circuits 5g2, 5g4, 5g8, 5g10, and 5g12 are correspondingly connected to the third contacts 2b2, 2b4, 2b8, 2b10, and 2b12 among the even-number contacts 2b. The forth contact 2b6 is connected to control terminals 5g2, 5g4, 5g8, 5g10, and 5g12 of the gate circuits 5g2, 5g4, 5g8, 5g10, and 5g12 correspondingly connected to the third contacts 2b2, 2b4, 2b8, 2b10, and 2b12.

As signals transmitted and received between the recording and reproducing device 1 and the computer body, there are signals such as reproduction signals from the recording medium transmitted from the recording and reproducing device 1 to the computer body and signals such as a drive select signal D/S, a motor-on signal M/O, a write gate signal W/G, a write data signal W/D, and a motor step signal M/S transmitted from the computer body to the recording and reproducing device 1.

The motor-on signal M/O is a signal for rotating the spindle motor which rotates the recording medium. When the signal is at the low level (Lo), the spindle motor is rotated. When the signal is at the high level (Hi), the rotation is stopped. The motor step signal M/S is a signal used for moving the recording head. When the signal changes from the low level (Lo) to the high level (Hi), the recording head is moved. The write gate signal W/G is used for providing a write instruction to write the write data signal W/D to the recording medium. When the signal is at the low level (Lo), the writing is instructed. When the signal is at the high level, the write instruction is cancelled. The drive select signal D/S is a signal for controlling the whole recording operation. When the signal is at the low level (Lo), the whole circuit part (not shown) for controlling the recording operation in the recording and reproducing apparatus 1 is made operative. When the signal is at the high level (Hi), the whole circuit part is made inoperative. When the drive select signal D/S is at the low level (Lo), the operation of the circuit part for controlling the recording operation to which the motor-on signal M/0, the motor step signal M/S, and the write gate signal W/G are supplied is therefore controlled.

The write gate signal W/G is allocated to the contacts $2b2$ and $4b2$, the write data signal W/D is allocated to the contacts $2b4$ and $4b4$, the motor-on signal M/O is allocated to the contacts $2b8$ and $4b8$, the drive select signal DIS is allocated to the contacts $2b10$ and $4b10$, and the motor step signal M/S is allocated to the contacts $2b12$ and $4b12$. The contact $2b34$ is used to receive other signals.

At the time of recording to the recording medium in the recording and reproducing device 1, when the write gate signal W/G, the motor-on signal M/O, and the drive select signal D/S from the computer body become at the low level (Lo), the recording operation is started.

For example, when the first connector 2 and the second connector 4 are inserted reversely, the odd-number contacts $4b1, 4b3, \ldots 4b33$ in the female connector 4 are connected to the even-number contacts $2b34, \ldots 2b4$, and $2b2$ in the male connector 2 and the even-number contacts $4b2, 4b4, \ldots 4b34$ in the female connector 4 are connected to the odd-number contacts $2b33, \ldots 2b3$, and $2b1$ in the male connector 2. Since the odd-number contacts $4b1, 4b3, \ldots 4b33$ in the female connector 4 are grounded on the computer body side, the even-number contacts $2b2, 2b4, \ldots 2b34$ in the male connector 2 are also grounded. Consequently, the input terminals of the gate circuits $5g2, 5g4, 5g8$, and $5g10$ connected to the even-number contacts $2b2, 2b4, 2b8$, and $2b10$ are grounded and become at the low level, thereby obtaining an operating state for recording the low level of the input terminal of the gate circuit $5g4$.

In this instance, however, the control terminals $5g2c, 5g4c, 5g8c, 5g10c$, and $5g12c$ of the gate circuits $5g2, 5g4, 5g8, 5g10$, and $5g12$ are connected to the contact $2b6$. The contact $2b6$ is grounded by the odd-number contact $4b29$ as the first contact in the second connector 4 and is at the low level. The input and output terminals of the gate circuits $5g2, 5g4, 5g8, 5g10$, and $5g12$ are not therefore in a connected state. Consequently, a signal at the low level supplied to the input terminal does not appear at the output terminal of each of the gate circuits $5g2, 5g4, 5g8, 5g10$, and $5g12$. As a result, the recording operation state is not obtained and erroneous recording does not occur. In this case, when the fourth contact $2b6$ is connected at least to the control terminal $5g10c$ of the gate circuit $5g10$ to which the drive select signal D/S for controlling the recording operation is supplied, the erroneous recording does not occur.

As mentioned above, the recording and reproducing device of the invention comprises the first connector having the plurality of contacts and the gate circuits for receiving signals from the computer body. The first connector is connected to both of the computer body and the second connector having the plurality of contacts. The second connector includes the first contacts grounded on the computer body side and the second contact to which no signals from the computer body are supplied. The first connector has the third contacts connected to the gate circuits and the fourth contact which is connected to the second contact in the first connecting state and is connected to the first contacts in the second connecting state, and the fourth contact is connected to the control terminals of the gate circuits. Consequently, when the first and second connectors are erroneously connected, the fourth contact is grounded via the first contacts. Thus, a signal at the low level is not outputted from the gate circuit connected to the third contact and the erroneous recording can be prevented.

In the recording and reproducing device of the invention, plural sets of the third contacts and the gate circuits connected to the third contacts are provided. Signals include at least the drive select signal for making the whole circuit part which controls the recording operation in the recording and reproducing device operative. Since the fourth contact is connected to at least the control terminal of the gate circuit to which the drive select signal is supplied, it is unnecessary to connect the fourth contact to the control terminals of the other gate circuits so that the wiring in the gate array is simplified.

What is claimed is:

1. A recording and reproducing device comprising a first connector having a plurality of contacts arranged in two rows of equal numbers of contacts and gate circuits, each gate circuit has an input terminal, an output terminal, and a control terminal, receives a signal from a host computer, and is connected with a circuit that controls a recording operation, connection between said input terminal and said output terminal in each gate circuit dependent on a signal applied to said control terminal, said first connector being connected to said host computer and a second connector having a plurality of contacts with the same total number of contacts as the first connector and arranged in two rows of equal numbers of contacts, wherein said first connector and said second connector are connected in either in a normal connecting state or an erroneous connecting state which is different from said normal connecting state, said signal being supplied to said gate circuit via said first and second connectors in said normal connecting state, said second connector has first contacts of a plurality of contacts in one row of the second connector and grounded on said host computer side, a second contact forming contacts in the other row of the second connector to which said signal from said host computer is not supplied, and a plurality of fifth contacts to which said signal from said host computer is supplied, said first connector has third contacts of a plurality of contacts in one row of the first connector, each third contact connected to the input terminal of a corresponding gate circuit of said gate circuits, a fourth contact forming contacts in the other row of the first connector and which is connected to said second contact in said normal connecting state and is connected to a predetermined first contact in said erroneous connecting state, and a plurality of sixth contacts that are grounded, said fourth contact being connected to each of the control terminals of said gate circuits, a high-level signal being applied to each of the control terminals of the gate circuits in the normal connecting state to cause the input terminals and output terminals of said gate circuits to be connected and each of the control terminals of the gate circuits in the erroneous connecting state being grounded to cause the input terminals and output terminals of said gate circuits to be unconnected.

2. A device according to claim 1, wherein a plurality of signals are supplied from said host computer and include at least a drive select signal that operates the circuit which controls the recording operation in said recording and reproducing device, and said fourth contact is connected at least to the control terminal of said gate circuit to which said drive select signal is supplied.

* * * * *